United States Patent
Apostolyuk et al.

(10) Patent No.: US 12,340,701 B2
(45) Date of Patent: Jun. 24, 2025

(54) SYSTEM AND METHOD FOR NAVIGATING AN AIRCRAFT

(71) Applicant: Lilium eAircraft GmbH, Wessling (DE)

(72) Inventors: Vladislav Apostolyuk, Munich (DE); Gustav Otto, Wörthsee (DE); Mirko Reuter, Dachau (DE); Ettore De Lellis, Munich (DE)

(73) Assignee: Lilium eAircraft GmbH, Wessling (DE)

( * ) Notice: Subject to any disclaimer, the term of this patent is extended or adjusted under 35 U.S.C. 154(b) by 287 days.

(21) Appl. No.: 17/671,942

(22) Filed: Feb. 15, 2022

(65) Prior Publication Data

US 2022/0270496 A1    Aug. 25, 2022

(30) Foreign Application Priority Data

Feb. 19, 2021    (EP) ..................... 21158162

(51) Int. Cl.
*G08G 5/34* (2025.01)
*B64D 43/00* (2006.01)
(Continued)

(52) U.S. Cl.
CPC ............... *G08G 5/34* (2025.01); *B64D 43/00* (2013.01); *B64D 45/00* (2013.01); *G08G 5/80* (2025.01)

(58) Field of Classification Search
None
See application file for complete search history.

(56) References Cited

U.S. PATENT DOCUMENTS

| | | | |
|---|---|---|---|
| 8,918,280 B1 * | 12/2014 | Heinrich | G08G 5/30 244/175 |
| 9,262,929 B1 | 2/2016 | Roy et al. | |

(Continued)

OTHER PUBLICATIONS

Murrieta-Mendoza, Alejandro et al., "Four- and Three-Dimensional Aircraft Reference Trajectory Optimization Inspired by Ant Colony Optimization," Nov. 2017, Journal of Aerospace Information Systems, vol. 14 No. 11, pp. 597-616 (Year: 2017).*

(Continued)

*Primary Examiner* — Ig T An
*Assistant Examiner* — Madison R. Inserra
(74) *Attorney, Agent, or Firm* — Meunier Carlin & Curfman LLC

(57) ABSTRACT

A system for navigating an aircraft, comprising a flight planning system configured to prepare a set of at least three different trajectories for a flight from a departure point to a destination point, a flight verification system configured to verify each trajectory of the set of trajectories, an onboard flight management system to be installed at an aircraft and having a storage unit for storing the set of trajectories, wherein the flight management system is configured to select one of the trajectories from the set of trajectories as an active trajectory for a current flight of the aircraft, wherein the flight management system includes a replanning unit configured to change, during the current flight, the active trajectory by selecting a second trajectory from the set of trajectories as the active trajectory for the current flight, such as to continue the current flight based on the second trajectory t.

13 Claims, 3 Drawing Sheets

Figure 1:
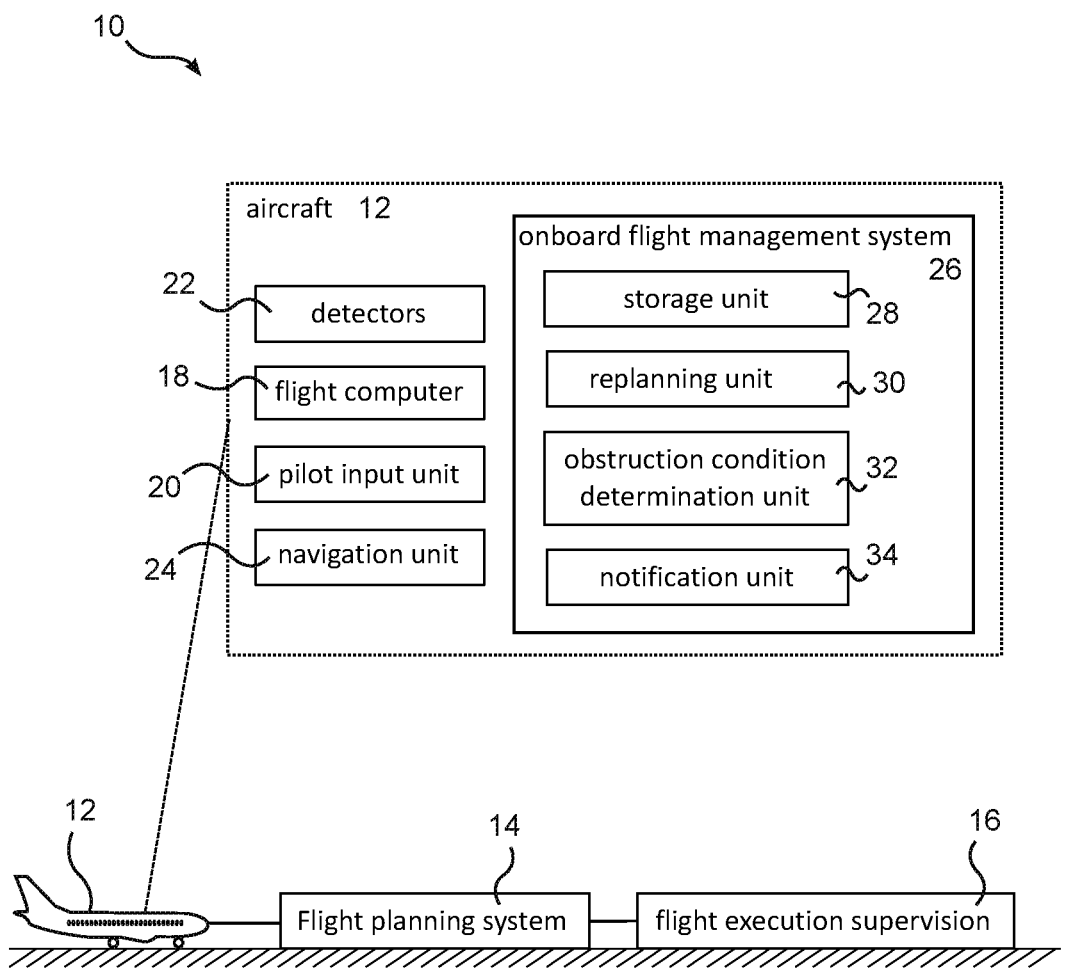

(51) Int. Cl.
  *B64D 45/00*   (2006.01)
  *G08G 5/80*    (2025.01)
  *A23B 40/60*       (2025.01)
  *G08G 5/56*        (2025.01)
  *H10D 30/67*       (2025.01)
  *H10D 30/69*       (2025.01)
  *H10D 84/01*       (2025.01)
  *H10D 84/90*       (2025.01)
  *H10F 39/18*       (2025.01)

(56) References Cited

U.S. PATENT DOCUMENTS

| 2013/0046422 | A1* | 2/2013  | Cabos .................... G08G 5/32 |
|              |     |         | 701/120 |
| 2019/0114564 | A1* | 4/2019  | Ferguson ......... G06Q 10/06315 |
| 2019/0283862 | A1* | 9/2019  | Hu ..................... G05D 1/0072 |
| 2020/0327814 | A1* | 10/2020 | Adolf ..................... B64D 27/24 |

OTHER PUBLICATIONS

Torres, Sergio et al., "Trajectory management driven by user preferences," Dec. 8, 2011, IEEE, 2011 IEEE/AIAA 30th Digital Avionics Systems Conference, pp. 3D3-1-3D3-11 (Year: 2011).*
International Search Report and Written Opinion issued for Application No. PCT/EP2022/052486, dated Jun. 3, 2022.
European Search Report for EP 21 158 162.4. 8 pages. Mailed Aug. 18, 2021.

* cited by examiner

SYSTEM AND METHOD FOR NAVIGATING AN AIRCRAFT

The present invention relates to a system for navigating an aircraft which includes a flight planning system, a flight verification system and an onboard flight management system. Furthermore, the present invention refers to a method for navigating an aircraft, including flight planning, flight verification and onboard flight management.

Conventional aircraft navigation for a flight from a departure point to a destination is based on a predetermined trajectory which is generated before the start of the flight and which is verified through a flight verification system such as a flight execution supervision, a flight dispatch system or an air navigation service provider on the ground, before start of the flight. The verified trajectory is loaded to an onboard flight management system of the aircraft and the flight is then commenced on a basis of that trajectory. If a replanning is necessary or desired during the flight, for example due to an unexpected situation such as an obstacle emerging within the trajectory or unexpected weather conditions, the pilot needs to prepare a new, modified trajectory which will be sent back to the flight execution supervision on the ground for verification. Upon clarification, the pilot operates the onboard flight management system to continue the flight based on the new trajectory. If the new trajectory is not approved by the flight execution supervision, the pilot needs to work out another trajectory proposal during the flight, which again will be sent to the ground for verification.

Conventional aircraft navigation as described above therefore requires a considerable amount of planning work as well as an experienced pilot, in a situation where a replanning is necessary. In addition, the one or more verification steps required for verifying the new trajectory with the flight execution supervision are relatively time consuming and may impede a fast reaction to an unexpected situation.

It is therefore an object of the present invention to provide a system and a method for navigating an aircraft which assists replanning during flight, reduces workload of the pilot and allows a more efficient reaction to changing circumstances during a flight. In particular embodiments, the invention addresses the objective problem of allowing re-routing of the aircraft without any pilot interaction.

According to a first aspect of the present invention, the above object is achieved by a system for navigating an aircraft comprising a flight planning system configured to prepare a set of at least three different trajectories for a flight from a departure point to a destination point, a flight verification system configured to verify each trajectory of the set of trajectories, and an onboard flight management system to be installed at an aircraft and having a storage unit for storing the set of trajectories, wherein the flight management system is configured to select one of the trajectories from the set of trajectories as an active trajectory for a current flight of the aircraft, wherein the flight management system includes a replanning unit configured to change, during the current flight, the active trajectory by selecting a second trajectory from the set of trajectories as the active trajectory for the current flight, such as to continue the current flight based on the second trajectory.

Hence, according to an important feature of the present invention, a set of at least three different trajectories for the same planned flight is prepared before the start of the flight and is verified through the flight verification system, for example a flight execution supervision, a flight dispatch system or an air navigation service provider on the ground, before starting the flight. The onboard flight management system is then adapted to store all verified trajectories, i.e. a verified set of trajectories, within the onboard flight management system. Only thereafter the flight is dispatched. In case of any circumstances occurring during the flight which require replanning, the onboard flight management system may switch the active trajectory to another trajectory among the set of verified trajectories without requiring the pilot to manually plan a new trajectory and without having to send the new trajectory for verification to the flight verification system on the ground. Therefore, workload for the pilot is greatly reduced, the time for replanning is shortened, and safety of the flight is improved. Even for less experienced pilots or even without any pilot aboard the aircraft in case of an autonomously flying aircraft, it will be possible to quickly and securely re-route the aircraft in case of an unexpected situation, such as changing weather conditions, detection of an obstacle in the trajectory or other circumstances that may require replanning.

The storage unit stores trajectory evaluation data for each trajectory of the set of trajectories, wherein the replanning unit is configured to select the second trajectory based on the trajectory evaluation data. Such trajectory evaluation data may assist the selection of a more suitable trajectory as the active trajectory in case of a re-routing. In particular, the trajectory evaluation data may be any kind of meta-data associated to the individual trajectories such as to allow ranking or prioritization of the trajectories or other evaluation of the trajectories during flight. Especially, the trajectory evaluation data may contain data relating to the costs, flight duration, arrival time, path length, energy requirements, comfort, spatial obstacle clearance (width of safe-to-fly corridor), temporal obstacle clearance (safe-to-fly time window) or other parameters of the particular trajectory.

In a preferred embodiment of the invention, the flight management system is adapted to update the trajectory evaluation data during flight based on flight data collected by a flight computer of the aircraft during the current flight. In this way, a more realistic or more suitable ranking of the trajectories is possible, because the trajectory evaluation data may be re-calculated or re-determined during flight based on a current flight situation or changed flight parameters. The onboard flight management system may thus switch to the best alternative trajectory for the particular situation.

In a further embodiment of the present invention, the aircraft comprises a pilot input unit for receiving a pilot re-routing command from a pilot, and the replanning unit is configured to change the active trajectory upon receiving a pilot re-routing command through the pilot input unit. This allows a pilot to manually initiate re-routing in order to react to any circumstances occurring during the flight or in response to reception of a re-routing command from an external source, such as from ground control, wherein the change of the trajectory is greatly assisted by the onboard flight management system of the present invention which may simply switch the active trajectory to another pre-verified trajectory such that additional planning and additional verification through a flight verification system on the ground may be omitted.

In a further preferred embodiment of the present invention, the flight management system comprises an obstruction condition determination unit for determining an obstruction condition for a trajectory based on flight data collected by a flight computer of the aircraft during the current flight, wherein the replanning unit is configured to change the active trajectory when the obstruction condition determination unit determines that the obstruction condition is fulfilled for the active trajectory. In this manner, the replanning unit may be integrated into a partially or fully automated flight control system which comprises several means for detecting obstructions, changed weather conditions or other data indicating that re-routing is required. Re-routing may then be initiated instantly without pilot interaction, by the replanning unit switching the active trajectory to another trajectory of the verified set of trajectories. Alternatively, re-routing may be a subject to confirmation by the pilot through a pilot input unit.

The obstruction condition for a trajectory obtained by the obstruction condition determination unit may comprise at least one condition selected from: the detection of an obstacle within or near the trajectory, the detection of a change in weather condition, the detection of a technical failure of the aircraft and the reception of a re-routing command from an external entity. The aircraft preferably comprises at least one sensor adapted to detect said obstruction condition or any value that may contribute to determination of the obstruction condition, for example a radar or a camera or a failure detector.

The flight management system may further comprise a notification unit for notifying the pilot about the obstruction condition. The pilot may thus initiate a re-routing by switching the active trajectory to another pre-verified trajectory, or may confirm an alternative trajectory proposed by the flight management system of the present invention. In case of an autonomously flying aircraft, which does not have a pilot aboard the aircraft, the notification may be transmitted to a ground control system for information about the rerouting operation or for confirmation of the rerouting operation.

According to a second aspect of the present invention, the above object is achieved by a method for navigating an aircraft comprising the steps of (a) using a flight planning system to prepare a set of at least three different trajectories for a flight from a departure point to a destination point, (b) using a flight verification system to verify each trajectory of the set of trajectories, (c) after completion of step b, starting the flight from the starting point towards the destination point based on a first trajectory selected from the set of trajectories, and (d) during the flight, operating an onboard flight management system of the aircraft to select a second trajectory from the set of trajectories and to switch navigation of the aircraft such as to continue the flight based on the second trajectory. With the method of the second aspect of the present invention, the same or corresponding advantages and effects can be achieved as described above for the system of the first aspect of the invention. In particular, by preparing and verifying a set of at least three different trajectories for the same flight before start of the flight and storing the verified trajectories in an onboard flight management system of the aircraft, the method allows safe and fast re-routing during the flight without the requirement of extensive manual planning of an alternative trajectory through the pilot and without additional verification of a new trajectory during the flight through a verification system on the ground. In an autonomously flying aircraft, which does not have a pilot, re-routing during the flight may even by performed completely automatically without any human interaction.

Preferably, a method according to the second aspect comprises one or more additional features as described above for the first aspect of the invention in order to achieve the same or corresponding effects.

In a further preferred embodiment of a method of the second aspect of the invention, the step of selecting a second trajectory comprises: determining a plurality of trajectory candidates from among the set of trajectories such that the current position of the aircraft is on or near each of the trajectory candidates, determining a ranking for each trajectory candidate based on trajectory evaluation data associated to each of the trajectory candidates, sequentially submitting, in an order according to their ranking, trajectory candidates to the onboard flight management system of the aircraft for validation processing, until a validated trajectory candidate is determined by the validation processing, and selecting the validated trajectory candidate as the second trajectory and switching navigation of the aircraft such as to continue the flight based on the second trajectory. Thus, in case of a re-routing during the flight, the best alternative trajectory is selected from among the plurality of trajectories stored in the flight management system, wherein a ranking of the trajectory candidates is used which may be dependent on the current flight situation, i.e. on current data collected during the flight etc. Furthermore, through validation of the trajectory candidates it can be ensured that a new trajectory fulfills certain criteria with regard to safety or meets the pilots approval.

In particular, the validation processing of a trajectory candidate by the flight management system may comprise a step of determining an obstruction condition for the trajectory candidate based on flight data collected by a flight computer of the aircraft during the current flight, and/or a step of receiving a pilot authorization command for the trajectory candidate through a pilot control device of the aircraft, wherein the validation process determines that a trajectory candidate is a validated trajectory candidate, if the obstruction condition is not fulfilled and/or if the pilot authorization command is received. By checking an obstruction condition, it can be ensured that a trajectory candidate is safe to fly under the current conditions based on current flight data. In addition or alternatively, by receiving a pilot authorization command it can be ensured that an additional manual confirmation of the pilot is obtained for a particular trajectory candidate.

Figure 2A:
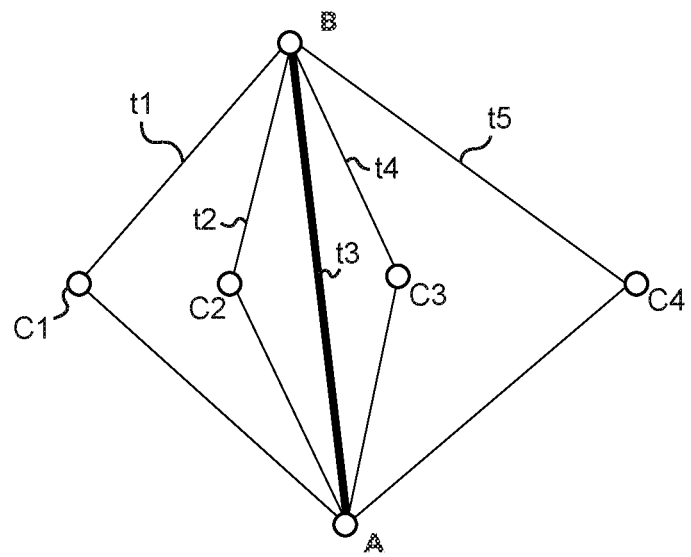
Figure 2B:
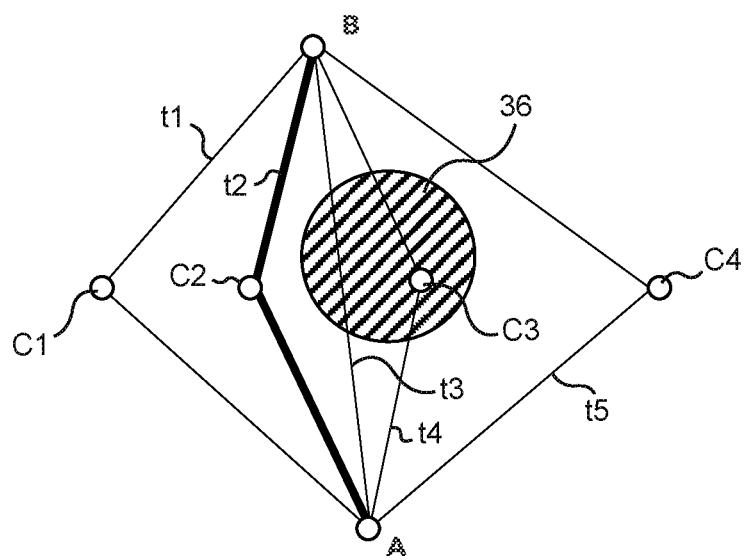
Figure 3:
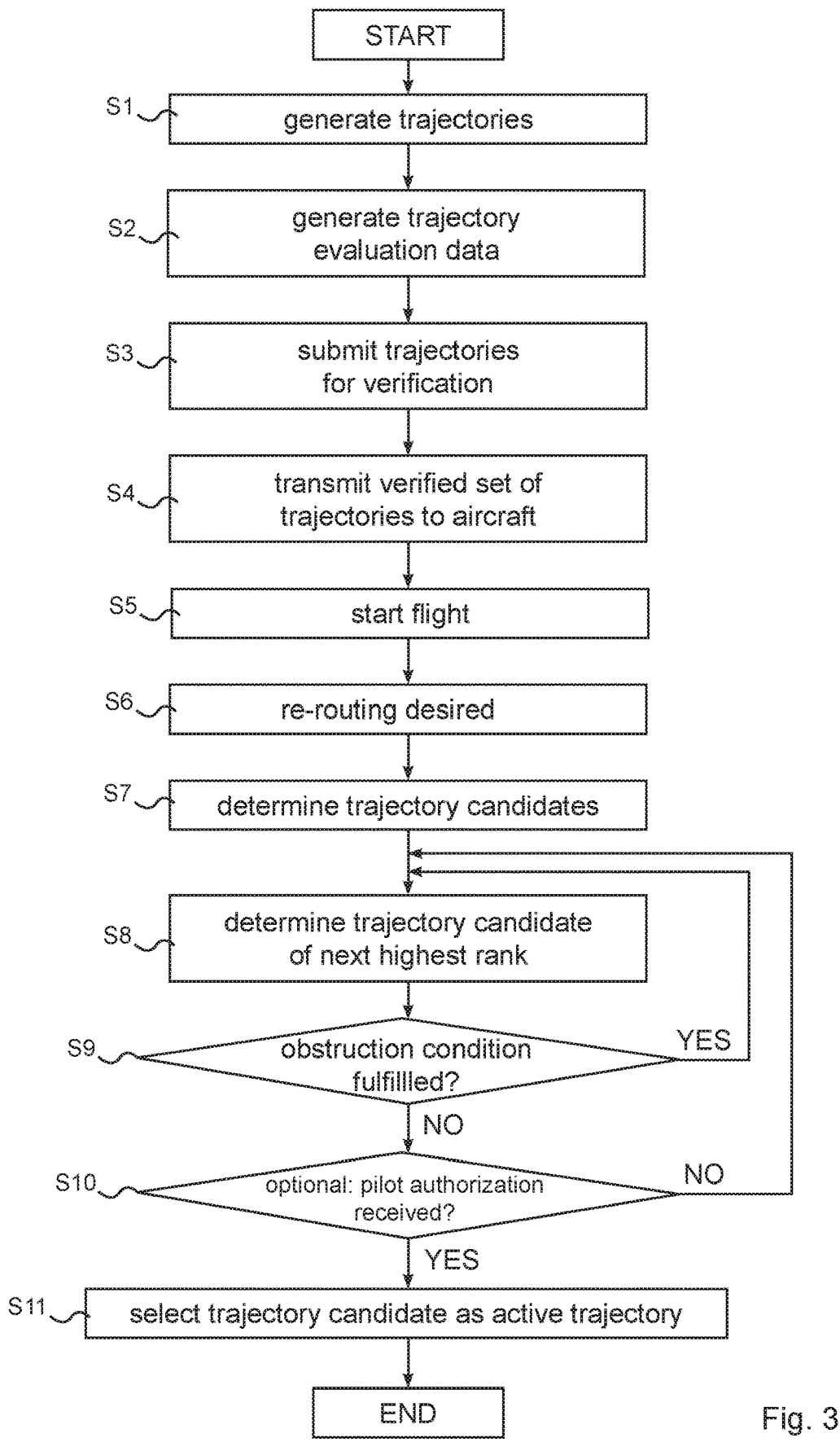

Preferred embodiments of the present invention will now be described with reference to the accompanying drawings, in which FIG. 1 shows a system for navigating an aircraft according to an embodiment of the present invention, FIGS. 2a and 2b show a navigation scheme based on different pre-verified trajectories according to the embodiment of the invention, and FIG. 3 shows a method for navigating an aircraft according to an embodiment of the present invention.

A system for navigating an aircraft 10 according to an embodiment of the present invention is shown in FIG. 1 and comprises an aircraft 12, a flight planning system 14 and a flight execution supervision 16. Aircraft 12 may be any type of aircraft, in particular a manned airplane, a helicopter or a vertical take-off and landing aircraft (VTOL aircraft), for example.

Flight planning system 14 may be embodied by a computer running a suitable software which is configured to plan a flight from a departure point to a destination point. In particular, flight planning system 14 may be on the ground and outside aircraft 12. In a manner known as such in the prior art, flight planning system 14 is configured to generate a trajectory for a flight from a desired departure point to a desired destination point taking into account map data, data of aircraft 12, weather data and general aviation data usually available to ground control.

Flight execution supervision 16 may be an official aviation authority or any other local authority responsible for approving intended flight trajectories or handling flight schedules. Flight execution supervision 16 may further represent a group of such authorities or any other verification systems that may be required by a law or local flight regulations for verification of an intended flight trajectory. Flight execution supervision 16 is external from aircraft 12 and usually ground-based.

According to the present invention, flight planning system 14 is adapted to generate a plurality of trajectories for a flight from a predetermined departure point to a predetermined destination point, and to send the plurality of trajectories to flight execution supervision 16 for verification. Flight planning system 14 is furthermore adapted to communicate with aircraft 12 when aircraft 12 is on the ground such as to transmit information about verified trajectories in a manner to be described later.

As shown in FIG. 1, aircraft 12 comprises a flight computer 18 which is configured in a manner known as such to a person skilled in the art to control operation of aircraft 12, a pilot input unit 20 having a plurality of control elements and input elements such as knobs, switches, touch input elements, for example, to accept pilot commands and transmits them to flight computer 18. Furthermore, a plurality of detectors 22 are usually installed at aircraft 12 such as radar detectors, cameras, pressure detectors, temperature detectors, acceleration detectors or gyroscopes, to name only a few. In addition, a navigation unit 24 installed at aircraft 12 may have a configuration known as such to a person skilled in the art, in order to navigate or assist navigation of the aircraft 12 on the basis of a certain trajectory. Navigation unit 24 may include a display showing the active trajectory to be followed by the aircraft 12 and may provide other guidance for the pilot to follow the trajectory. In addition or alternatively, navigation unit 24 may automatically or semi-automatically control aircraft 12 to follow the active trajectory without or with only reduced pilot interaction, for example in an autopilot mode.

A trajectory based on which a navigation unit 24 is operative such as described above may include data relating to the departure point, the destination point, and to a plurality of the intermediate points along the intended path of travel of the aircraft 12, wherein all such points may be stored by their respective geographic coordinates. In addition or as an alternative, the trajectory may include data relating to a travelling path between two points along the trajectory, in particular an information as to whether the flight path between two points of the trajectory is a linear path or a curved path, such as a circular arc of certain radius. Any other ways to describe the path of movement from a departure point to a destination point is encompassed in the term "trajectory" in this disclosure as well.

Aircraft 12 according to the present embodiment further comprises an onboard flight management system 26 adapted to manage navigation of the current flight and in particular to set an active trajectory for navigation, which is provided to navigation unit 24. Onboard flight management system 26 may comprise a storage unit 28 adapted to store a plurality of trajectories in parallel such that aircraft 12 has access to a number of trajectories during the flight without the need of any data transfer from an external entity. In addition, onboard flight management system 26 may have a replanning unit 30 adapted to change, during a current flight, the active trajectory such that navigation unit 24 stops navigation based on a current trajectory and continues navigation based on a new trajectory.

In addition, onboard flight management system 26 may have an obstruction condition determination unit 32 adapted to detect an obstruction condition for the current trajectory occurring during a flight. Determination of the obstruction condition by the obstruction condition determination unit 32 may be based on flight data collected by flight computer 18 through detectors 22 or through pilot input unit 20. Obstruction condition determination unit 32 may in particular be adapted to detect an obstacle within or near the active trajectory, a change in weather condition, a technical failure of the aircraft 12 and/or to receive a re-routing command from an external entity such as another aircraft or from ground. Obstruction condition determination unit 32 is connected to replanning unit 30 for initiating re-routing and/or to a notification unit 34 of the onboard flight management system for notifying the pilot about the obstruction.

A method for navigating an aircraft according to an embodiment of the present invention will now be described with reference to FIGS. 2a, 2b and 3. The method may in particular be carried out by a system 10 according to the embodiment shown in FIG. 1, and in the following such system 10 will be used for explanation of the method.

The method of the embodiment relates to navigation of aircraft 12 from a departure point A to a destination point B as shown in FIGS. 2a and 2b. In a first step S1 of the method, a plurality of trajectories are generated by flight planning system 14. For example, a set of five trajectories t1, t2, t3, t4, t5 is generated based on map data, weather data and certain other aviation data available before the flight. The first trajectory t1 is defined from A to B via an intermediate point C1, the second trajectory t2 is defined from A to B via a second intermediate point C2, a third trajectory t3 is defined as a direct path from A to B, a fourth trajectory t4 is defined from A to B via a third intermediate point C3, and a fifth trajectory t5 is defined from A to B via a fourth intermediate point C4. In the present example, the travelling path from A to any of the intermediate points C1 to C4 as well as the travel path from any of the intermediate points C1 to C4 to destination point B as well as the direct trajectory t3 are each straight lines, whereas other paths such as arc shaped paths would be possible as well.

Together with the trajectories, flight planning system 14 generates trajectory evaluation data in a step S2. The trajectory evaluation data may include information about the flight duration, arrival time, path length, energy costs or other specific data for each trajectory such as data relating to comfort, spatial obstacle clearance, temporal obstacle clearance etc. In general, such trajectory evaluation data are data suitable for determining a ranking of the trajectories in order to assist a decision which of the trajectories should be selected as the active trajectory. For example, in the embodiment shown in FIG. 2a, at a time of generating the trajectories and the trajectory evaluation data by flight planning system 14 before start of the flight, a trajectory t3 which corresponds to the direct travel from A to B may be ranked highest as it may have the desired flight duration, nominal arrival time, shortest path length, lowest energy costs, for example. Based on such criteria, the order of the other trajectories from a highest rank (most preferred) to lowest rank (least preferred) may for example be as follows: t4, t2, t1, t5.

In the next step S3 of the method, the trajectories may be transmitted for verification to flight execution supervision 16. Flight execution supervision 16 may then return to flight planning system 14 an information indicating which of the trajectories are verified (approved). In particular, verification may include manual review of the trajectories by aviation officials, check of the trajectories with respect to flight schedules and trajectories of other aircrafts, check of weather conditions, check local rules and requirements etc.

In the next step S4 of the method, flight planning system 14 transmits all verified trajectories together with their respective trajectory evaluation data to aircraft 12, wherein aircraft 12 stores the set of trajectories as well as the trajectory evaluation data within storage unit 28 of onboard flight management system 26. In the present example it may be assumed that all trajectories t1 to t5 have been verified by flight execution supervision 16 and will thus be transmitted to and stored in storage unit 28. If one or more trajectories would be rejected by flight execution supervision 16, only the remaining, verified trajectories would be stored in storage unit 28 of the aircraft 12.

After transmission of the trajectories and storing the trajectories within aircraft 12, the flight is started in the step S5, wherein the trajectory having the highest ranking, in the present example trajectory t3, is selected as the active trajectory.

Later on during the flight, a re-routing may be desired in a step S6 of the method, for example if the pilot desires to re-route the aircraft 12 for any reason such as if an obstruction is determined by obstruction condition determination unit 32, for example due to changed weather conditions or due to an unexpected object detected in the intended flight path or any other unexpected occurrence. In the present example shown in FIG. 2b, a weather obstruction 36 has been detected by obstruction condition determination unit 32 and/or a weather station on the ground, which makes the active trajectory t3 no longer feasible.

If the obstruction condition is fulfilled, in step S7 the onboard flight management system 26 determines a plurality of trajectory candidates from among the set of trajectories stored in storage unit 28 (from among the verified set of trajectories). In particular, those trajectories which contain the current position of aircraft 12 or which are close to the current position or aircraft 12, except for the current trajectory, may be determined as trajectory candidates. In the sense of the present disclosure, the current position and a given trajectory are "close to" one another, if travelling of the aircraft 12 to the trajectory (such as to be located exactly on the trajectory) would not need generation of an additional trajectory which would need additional approval or verification through flight execution supervision or other external verification. In the present example, trajectories t1, t2, t4 and t5 are determined as trajectory candidates.

The trajectory evaluation data of the trajectory candidates determine a specific ranking of the trajectory candidates from the most desired trajectory (highest rank) to the least desired trajectory (lowest rank). In the example shown in FIGS. 2a and 2b, trajectory candidate t4 has the highest rank, followed by t2 having the second highest rank, t1 having the third highest rank and t5 having the fourth highest or lowest rank.

In step S8, the trajectory candidate of the highest rank, t4 in the example shown, is then determined first and is submitted to a validation processing within onboard flight management system 26 in steps S9 and S10. In particular, in step S9, it may be determined by obstruction condition determination unit 32 whether or not an obstruction condition is fulfilled for the trajectory candidate in question. In particular, based on current flight data collected by flight computer 18, for example flight data obtained from detection results of detectors 22 or from external information sources such as from a ground control, it may be determined whether or not the trajectory candidate would be feasible to fly at the current point in time and/or under the current circumstances. If it is not possible to fly along the trajectory candidate in question, such as in case of trajectory candidate t4 for which it is determined that weather obstruction 36 exits as well, the obstruction condition is fulfilled for this trajectory candidate and the process returns to step S8 to determine another trajectory candidate having the next lower rank, i.e. one rank lower than the previous trajectory candidate, and validation processing is repeated with the new trajectory candidate. In the present example, the trajectory candidate having the next lower rank is t2 and therefore validation processing is repeated based on t2.

If the obstruction condition is not fulfilled in step S9, such as for t2 which circumvents the weather obstruction 36, in the case of a flight operated by a pilot aboard the aircraft, the process may proceed to step S10 to determine whether authorization from the pilot is received or not. Step S10 may include notifying the trajectory candidate in question to the pilot through the notification unit 34, for example by displaying the trajectory candidate at a virtual map on a display of the notification unit 34. The pilot may then be prompted to either accept or reject the trajectory candidate in question. If the trajectory candidate is rejected and pilot authorization is thus not received, the process returns to step S8 and determines another trajectory candidate of the next lower rank, i.e. one rank lower than the previous trajectory candidate, and repeats the validation processing with the new trajectory candidate. Otherwise, if pilot authorization is received in step S10, which may be assumed in the present example for trajectory candidate t2, the trajectory candidate is considered validated and is selected by replanning unit 30 as the new active trajectory. Navigation unit 24 is operated based on the new trajectory and re-routing is thus completed.

It should be noted here, that in particular step S10 of the method is an optional feature for a pilot-operated flight. In case of an autonomous flight without a pilot aboard the aircraft, step S10 may be omitted and the process may automatically proceed to step S11 to switch the trajectory after it has been determined in step S9 that the obstruction condition is not fulfilled.

It should further be noted that, throughout the flight, the trajectory evaluation data may be updated based on flight data of the current flight as obtained by the flight computer 18, for example based on detection results of detectors 22, receipt of external information from an external entity or pilot input. Accordingly, the ranking of the trajectories may change at any point in time during the flight which may have an influence on the order in which the trajectory candidates are submitted to the validation processing in steps S9 and S10, for example. Furthermore, in addition to just approving or rejecting trajectory candidates in the validation processing of steps S9 and S10, one or both of steps S9 and S10 may include changing the rank of a trajectory candidate based on a determination result of the obstruction condition determination unit 32 and/or a pilot input through pilot input unit 20.

Furthermore, it should be noted that one or more of the trajectories which are verified before the start of the flight and stored in the storing unit of the onboard flight management system may be emergency trajectories which are to be selected as an active trajectory in case of an emergency detected by the flight computer or the pilot. Emergency trajectories may include a safe trajectory towards the nearest possible landing point. By pre-verification and pre-storing such emergency trajectories before start of the flight as described herein according to the invention, operation of the aircraft in case of an emergency may be improved even if communication with the ground is interrupted or parts of the aircraft are inoperative. In particular, in such embodiment, if an emergency is detected, only emergency trajectories are determined as trajectory candidates in order to accelerate finding a new safe trajectory to handle the emergency.

The invention claimed is:

1. A system for navigating an aircraft, comprising:
a flight planning system comprising a computer running a suitable software, configured to prepare a set of at least three different trajectories (t1-t5) for a flight from a departure point (A) to a destination point (B),
a flight execution supervision system in communication with the flight planning system and comprising an official aviation authority or any other local authority responsible for approving intended flight trajectories or handling flight schedules, configured to receive and verify each trajectory of the set of trajectories,
an onboard flight management system comprising a computer executing a plurality of software modules to be installed at an aircraft and having a storage unit for storing the set of at least three different trajectories (t1-t5), wherein the flight management system is configured to select one of the trajectories from the set of trajectories as an active trajectory for a current flight of the aircraft, and wherein the set of at least three different trajectories (t1-t5) for the flight are prepared, verified, and stored in the storage unit of the onboard flight management system pre-flight,
wherein one of the flight management system software modules includes a replanning unit configured to change, during the current flight, the active trajectory (t3) by selecting a second trajectory (t2) from the set of trajectories as the active trajectory for the current flight, such as to continue the current flight based on the second trajectory (t2),
wherein at a time of changing navigation of the aircraft to the second trajectory the current position of the aircraft is on both the first trajectory and the second trajectory,
wherein selecting a second trajectory comprises:
determining a plurality of trajectory candidates from among the set of trajectories such that the current position of the aircraft is on each of the trajectory candidates, wherein each trajectory candidate of the plurality of trajectory candidates has been verified before the flight,
determining a ranking for each trajectory candidate based on trajectory evaluation data associated to each of the trajectory candidates,
sequentially submitting, in an order according to their ranking, trajectory candidates to the onboard flight management system of the aircraft for validation processing, until a validated trajectory candidate is determined by the validation processing, and
selecting the validated trajectory candidate as the second trajectory and switching navigation of the aircraft such as to continue the flight based on the second trajectory.

2. The system for navigating an aircraft as claimed in claim 1, wherein the storage unit further stores trajectory evaluation data for each trajectory of the set of trajectories, and wherein the replanning unit is configured to select the second trajectory based on the trajectory evaluation data.

3. The system for navigating an aircraft as claimed in claim 1, wherein the flight management system is adapted to update the trajectory evaluation data during flight based on flight data collected by a flight computer of the aircraft during the current flight.

4. The system for navigating an aircraft as claimed in claim 1, wherein the aircraft comprises a pilot input unit comprising a plurality of control elements and input elements for receiving a pilot re-routing command from a pilot, and wherein the replanning unit is configured to change the active trajectory upon receiving a pilot re-routing command through the pilot input unit.

5. The system for navigating an aircraft as claimed in claim 1, wherein another of the flight management system software modules comprises an obstruction condition determination unit for determining an obstruction condition for a trajectory based on flight data collected by a flight computer of the aircraft during the current flight, and wherein the replanning unit is configured to change the active trajectory when the obstruction condition determination unit determines that the obstruction condition is fulfilled for the active trajectory.

6. The system for navigating an aircraft as claimed in claim 5, wherein said obstruction condition for a trajectory is at least one condition selected from:
detection of an obstacle within the trajectory,
detection of a change in weather condition,
detection of a technical failure of the aircraft,
reception of a re-routing command from an external entity.

7. The system for navigating an aircraft as claimed in claim 5, wherein another of the flight management system software modules comprises a notification unit for notifying the pilot about the obstruction condition.

8. A method for navigating an aircraft, comprising the steps of
a) using a flight planning system to prepare a set of at least three different trajectories for a flight from a starting point to a destination point, said flight planning system comprising a computer running a suitable software,
b) using a flight execution supervision system to receive and verify each trajectory of the set of trajectories, said flight execution supervision system in communication with the flight planning system and comprising an official aviation authority or any other local authority responsible for approving intended flight trajectories or handling flight schedules,
c) after completion of step b, starting the flight from the starting point towards the destination point based on a first trajectory selected from the set of trajectories, and
d) during the flight, operating an onboard flight management system comprising a computer executing a plurality of software modules of the aircraft to select a second trajectory from the set of trajectories and to switch navigation of the aircraft such as to continue the flight based on the second trajectory,
wherein at the time of switching navigation of the aircraft to the second trajectory the current position of the aircraft is on both the first trajectory and the second trajectory,
wherein the set of at least three different trajectories for the flight are prepared, verified, and stored in a storage unit of the onboard flight management system pre-flight, and
wherein the step of selecting a second trajectory comprises:
determining a plurality of trajectory candidates from among the set of trajectories such that the current position of the aircraft is on each of the trajectory candidates, wherein each trajectory candidate of the plurality of trajectory candidates has been verified before the flight, determining a ranking for each trajectory candidate based on trajectory evaluation data associated to each of the trajectory candidates, sequentially submitting, in an order according to their ranking, trajectory candidates to the onboard flight management system of the aircraft for validation processing, until a validated trajectory candidate is determined by the validation processing, and selecting the validated trajectory candidate as the second trajectory and switching navigation of the aircraft such as to continue the flight based on the second trajectory.

9. The method for navigating an aircraft as claimed in claim 8, further comprising storing the set of trajectories on a storage unit of the flight management system after completion of step b.

10. The method for navigating an aircraft as claimed in claim 8, wherein each trajectory of the set of trajectories is associated to trajectory evaluation data, wherein, in step d, the second trajectory is selected based on the trajectory evaluation data.

11. The method for navigating an aircraft as claimed in claim 8, wherein navigation of the aircraft is switched to the second trajectory upon a pilot re-routing command received through a pilot control device comprising a plurality of control elements and input elements of the aircraft.

12. The method for navigating an aircraft as claimed in claim 8, wherein navigation of the aircraft is switched to the second trajectory after determination of an obstruction condition for the first trajectory based on flight data collected during the flight.

13. The method for navigating an aircraft as claimed in claim 8, wherein validation processing of a trajectory candidate by the flight management system comprises at least one of determining an obstruction condition for the trajectory candidate based on flight data collected by a flight computer of the aircraft during the current flight, or receiving a pilot authorization command for the trajectory candidate through a pilot control device comprising a plurality of control elements and input elements of the aircraft, wherein the validation process determines that a trajectory candidate is a validated trajectory candidate, if the obstruction condition is not fulfilled and/or if the pilot authorization command is received.

\* \* \* \* \*